United States Patent

Nervik

[15] 3,663,296
[45] May 16, 1972

[54] METHOD FOR REMOVAL OF RESIDUAL NITRATE FROM NEGATIVE BATTERY PLATES

[72] Inventor: Torbjorn Nervik, Selbu, Norway
[73] Assignee: ESB Incorporated
[22] Filed: Aug. 26, 1970
[21] Appl. No.: 67,264

[52] U.S. Cl. ............................................................136/24
[51] Int. Cl. .....................................................H01m 43/04
[58] Field of Search ...................136/24, 76, 75, 34; 117/230

[56] References Cited

UNITED STATES PATENTS

| | | |
|---|---|---|
| 3,284,237 | 11/1966 | Lambert et al. ..........................136/24 |
| 3,540,930 | 11/1970 | Loukomsky..............................136/24 |
| 3,489,612 | 1/1970 | Falk.........................................136/24 |

*Primary Examiner*—Winston A. Douglas
*Assistant Examiner*—C. F. Lefevour
*Attorney*—Alfred J. Snyder, Jr., Robert H. Robinson, Raymond L. Balfour and Anthony J. Rossi

[57] ABSTRACT

A process is described for the removal of residual nitrate from battery plaques impregnated with cadmium hydroxide by thermal decomposition of the nitrate after the normal impregnation processing is completed.

1 Claim, No Drawings

METHOD FOR REMOVAL OF RESIDUAL NITRATE FROM NEGATIVE BATTERY PLATES

BACKGROUND OF THE INVENTION

1. Field of the Invention

This invention relates to the processing of negative plates for storage battery use. In particular, it relates to a way to reduce the nitrates in sintered nickel plaques which have been impregnated with cadmium nitrate and then treated with an alkaline solution.

2. Description of the Prior Art

An important feature of storage batteries is their ability to retain a charge when not in use. Different duties require different degrees of charge retention, but in general the better the charge retention, the more desirable the battery.

Experimenters have found that the presence of impurities in the battery system can be a major factor in reducing the charge retention of an otherwise satisfactory battery system. In the nickel cadmium system, it has been found that the presence of nitrate ion in the electrolyte can reduce charge retention in a drastic manner.

It is not necessary to go into the chemical reactions other than to state that the reaction with nitrate seems to be some form of oxidation-reduction reaction with the ions moving back and forth between the positive and negative electrodes. In the case of the sealed nickel cadmium cell system with its limited electrolyte volume, nitrate limitation is of particular importance in the control of charge retention.

In the normal processing of sintered nickel plaques to prepare them for use as negative plates, the porous plaque is impregnated with cadmium nitrate solution. The cadmium is precipitated in the pores of the plaque by the action of a strong alkaline solution. Then the plaque is washed and dried.

In order to get a sufficient deposit of cadmium hydroxide, the impregnation steps are repeated several times. This process is old in the battery making art and does not form a part of the present invention.

With normal treatment as described above, there is a residue of nitrate left in the plate amounting to about 0.3 percent even with repeated washing.

Another process for the impregnation of plaques has been disclosed in which a nickel plaque is dipped in cadmium nitrate bath made by melting cadmium nitrate crystals in their water of hydration. The plaque is then heated in a hydrogen atmosphere at a temperature of 200° to 300° C. to convert the cadmium nitrate to cadmium oxide. Unfortunately, the treatment in hot concentrated molten cadmium nitrate solution is somewhat destructive to the nickel plaque and it loses much of its strength in this treatment. For this reason, the molten salt process has had only limited use.

SUMMARY OF THE INVENTION

In the method of this invention, a sintered nickel plaque, fully impregnated with cadmium hydroxide converted from cadmium nitrate in the normal manner is heated to a temperature between 350° and 900° C. until the residual nitrates have decomposed. The plaque is then soaked in a hot alkaline solution until the cadmium oxide formed by thermal decomposition has been converted to cadmium hydroxide. The plaque is then washed and dried.

This treatment differs from other processes in that the nickel plaque is at no time exposed to concentrated cadmium nitrate at high temperatures and the corrosion of the plaque observed with other techniques does not occur. Further, because the corrosive nitrate is not present in any great concentration it is possible to conduct the thermal decomposition step at higher temperatures and thus with more completeness than can be done with processes where nitrates are present in quantity. It is these features that differentiate the present process from others that have been proposed. By this treatment, the nitrate content of the negative plate can be reduced to a range of 0.015 to 0.03 percent by the treatment to be described. This level of nitrate is below the harmful level and plates so treated show exceptionally high charge retention and still maintain maximum plaque strength.

A more complete understanding of the nature and scope of the invention will be found in the following detailed description of the proposed treatment.

DESCRIPTION OF THE PREFERRED EMBODIMENT

The reduction in the nitrate content is achieved by heating the fully impregnated plaque to a temperature above the decomposition temperature of cadmium nitrate (350° C.) and below the decomposition point of cadmium oxide (900° C.). With this treatment, the residual cadmium nitrate is decomposed to cadmium oxide and nitrogen oxide gasses. The gasses pass off and the cadmium oxide remains. However, the cadmium hydroxide which actually forms by far the greater portion of the active material is also decomposed to cadmium oxide (at 300° C.) and water vapor. This operation must be carried out in an inert atmosphere such as argon or nitrogen to prevent oxidation of the nickel plaque. With normal gas circulation, 30 to 45 minutes at temperature is sufficient for the treatment.

The second step of the process is the rehydration of the cadmium oxide. This can be accomplished by soaking the treated plates in hot or boiling water. Actually, I have found it better to use a boiling hot solution of sodium hydroxide, sodium hydroxide plus barium hydroxide, sodium sulfate or potassium hydroxide for this rehydration treatment. Time of treatment can be between 1 and 2 hours. To complete the processing, the plates after this treatment are washed in water and dried.

I have further found that the use of this treatment is far more effective in the removal of nitrate than is repeated washings in the normal process. Therefore, it is possible by the use of the process to reduce the normal washing process, thus saving time, wash water and the need for treating large quantities of slightly contaminated waste.

EXAMPLE

Two cells were built with identical parts. In one case, cell 1188B, the negative plates were used just as they came from the impregnation. In the second case, cell 1188C, the negative plates, taken from the same impregnation lot as cell B, received the following additional treatment.

Heat at 420° C. for 30 minutes in nitrogen atmosphere, cool, soak in 20 percent sodium hydroxide for 3 hours, wash in deionized water at 95° C. and dry in air at 100° C.

The cells were sealed, formed and tested for stand loss. In this test, the cells were held at a temperature of 45° C. for 2 weeks and then tested for electrical capacity. The results were:

| Cell | % of Pre-Test Capacity |
|---|---|
| 1188B | 0.0% |
| 1188C | 37% |

Having thus fully described my invention, I claim:

1. A method for the removal of residual cadmium nitrate from sintered nickel plaques impregnated with cadmium nitrate which has been substantially fully converted to cadmium hydroxide by immersion in a strongly alkaline solution for use as a negative storage battery plate which comprises:
   a. heating a fully impregnated plaque at a temperature between 400° and 440° C for a period of 30 to 45 minutes in an inert atmosphere of nitrogen gas;
   b. soaking the previously heated plaque in a solution of 20 percent sodium hydroxide at a temperature near boiling for approximately 3 hours;
   c. washing the plaque in water; and
   d. drying the washed plaque.

* * * * *